(12) United States Patent
Otteman

(10) Patent No.: US 6,469,829 B2
(45) Date of Patent: Oct. 22, 2002

(54) EQUALIZED PIVOT MOUNT FOR RIFLESCOPE

(75) Inventor: Rodney H. Otteman, Aloha, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 0 days.

(21) Appl. No.: 10/043,614

(22) Filed: Jan. 9, 2002

(65) Prior Publication Data

US 2002/0089742 A1 Jul. 11, 2002

Related U.S. Application Data

(60) Provisional application No. 60/260,584, filed on Jan. 9, 2001.

(51) Int. Cl.$^7$ .............................. G02B 23/00; F41G 1/38
(52) U.S. Cl. ..................... 359/429; 359/399; 359/425; 33/245
(58) Field of Search ..................... 359/399, 423–429, 359/819, 822; 42/101–103, 120; 33/245–248, 233, 297–298

(56) References Cited

U.S. PATENT DOCUMENTS

| | | | |
|---|---|---|---|
| 3,297,389 A | 1/1967 | Gibson | 359/424 |
| 3,684,376 A * | 8/1972 | Lessard | 33/245 |
| 3,918,791 A | 11/1975 | Perry | 359/429 |
| 4,395,096 A | 7/1983 | Gibson | 359/429 |
| 4,408,842 A * | 10/1983 | Gibson | 359/428 |
| 5,463,495 A * | 10/1995 | Murg | 359/429 |
| 5,615,487 A * | 4/1997 | Tomita | 33/245 |
| 5,671,088 A | 9/1997 | Mai et al. | 359/424 |
| 6,005,711 A * | 12/1999 | Mai et al. | 359/424 |

\* cited by examiner

*Primary Examiner*—Thong Nguyen
(74) *Attorney, Agent, or Firm*—Stoel Rives LLP

(57) ABSTRACT

A force-equalized pivot mount for a telescopic sight such as a riflescope includes a lens holder having a pivot end positioned between a fixed half-socket and an opposing movable half-socket. A resilient member biases the movable half-socket toward the fixed half-socket to pivotally capture the pivot end therebetween. Rotation of the lens holder generates first lateral friction forces at a first sliding interface between the fixed half-socket and the pivot end that are equalized by oppositely-directed second friction forces generated at a second sliding interface between the movable half-socket and the pivot end. Force-equalization prevents the lens holder from walking within the pivot mount, reduces wear at the sliding interfaces, and improves aiming accuracy.

19 Claims, 3 Drawing Sheets

EQUALIZED PIVOT MOUNT FOR RIFLESCOPE

RELATED APPLICATIONS

This application claims the benefit under 35 U.S.C. § 119(e) of U.S. Provisional Patent Application No. 60/260,584, filed Jan. 9, 2001, which is incorporated herein by reference.

TECHNICAL FIELD

This application relates to devices for pivotally mounting a lens holder within the housing of a telescopic sight such as a riflescope and, in particular, to a pivot mount having opposing socket elements that can be sized to laterally-equalize friction forces imparted to the lens holder when it is pivoted within the housing.

BACKGROUND OF THE INVENTION

Riflescopes typically include eyepiece and objective lenses positioned at opposite ends of a tubular housing. In variable optical power scopes, an erector lens positioned medially of the eyepiece and objective lenses is movable along a central longitudinal axis of the housing for adjustment of the optical power of the riflescope. An aiming reticle is positioned in the optical path of the rifle scope, typically between the erector lens and the eyepiece lens.

Because bullet trajectory, wind conditions, and the distance to the target can vary depending upon shooting conditions, quality riflescopes allow the shooter to compensate for such variations by a mechanism that adjusts the aim of the sight relative to the rifle on which it is mounted. The aiming adjustments are known as "windage" and "holdover" and are typically accomplished by lateral movement of the erector lens within the housing to divert the optical path of the observed light before it reaches the reticle, as shown in U.S. Pat. Nos. 3,297,389 and 4,408,842 of Gibson. In these designs, a pivot end of a pivot tube that extends along the longitudinal axis is pivotally mounted to the interior of the housing. The erector lens is supported near a free end of the pivot tube opposite the pivot end. A marksman accomplishes adjustment of windage and holdover by turning a laterally protruding screw or other adjustment mechanism that drives the free end of the pivot tube laterally within the housing of the riflescope.

U.S. Pat. No. 4,408,842 of Gibson describes a half-socket pivot mount for a riflescope that includes a spring for urging a spherical end of the pivot tube against a conical socket surface formed in the housing. The conical socket surface helps to center the spherical end on the longitudinal axis. Because the spherical end of the pivot tube contacts the conical socket along only a small circular band, friction and wear are high at the contact area relative to full-socket pivot mounts (which have a much larger contact area). Also, as described below, the frictional forces may cause the spherical end to walk and become offcentered.

Riflescopes with full ball and socket pivot mounts for the erector lens tube have previously been proposed, as shown in U.S. Pat. No. 3,297,389 of Gibson and U.S. Pat. No. 3,918,791 of Perry. These prior art full ball and socket mounts employ no socket spring to hold the pivot assembly together, absorb rifle recoil, and enable smooth adjustment of the erector lens holder tube for windage and range elevation corrections. Spherical sockets also require tighter manufacturing tolerances to ensure a snug fit between the socket and the ball.

FIG. 1 shows a schematic side sectional view of a prior-art riflescope 100 including a half-socket pivot mount 106. With reference to FIG. 1, riflescope 100 includes a tubular housing 110 having an interior socket surface 114. A pivot tube 120 mounted within housing 110 includes a hemispherical pivot end 124 sized for a sliding fit against socket surface 114 and a free end 126 extending within the housing away from pivot end 124. For clarity, socket surface 114 and pivot end 124 are shown spaced apart. However, in practice, pivot end 124 is in sliding contact with socket surface 114. Socket surface 114 is shown in FIG. 1 as frusto-spherical in shape, but, as discussed above, it is also known to use a frusto-conical socket surface to help keep pivot mount 106 centered. A pivot spring (not shown) such as a wave spring or a set of coil springs biases hemispherical pivot end 124 against socket surface 114 in the direction shown by $F_s$. Pivot mount 106 is positioned proximal of an eyepiece end 130 of riflescope 100. However, it is also known to position a pivot mount near the objective end (not shown) of the riflescope.

In operation, a marksman adjusts the orientation of pivot tube 120 within housing 110 by turning adjustment knobs (not shown) that extend laterally from housing 110. The adjustment knobs apply adjustment forces $F_A$ to the free end 126 of pivot tube 120 and thereby cause the pivot tube 120 to rotate transversely of housing 110 in the direction indicated by arrows 140. Ideally, pivot tube 120 pivots about a pivot point 150 located on a longitudinal axis 156 of housing 110. However, in practice, the spring force $F_S$ and pivotal movement results in lateral frictional forces $F_{f1}$ and $F_{f2}$. These lateral frictional forces $F_{f1}$ and $F_{f2}$ can cause the pivot end 124 to "walk" out of alignment relative to housing 110 such that the center of curvature of pivot end 124 no longer falls on longitudinal axis 156. This walking effect can affect the aim of riflescope 100. Walking can also cause the pivot spring to compress and further increase the friction and wear at the socket surface 114.

Thus there exists a need for a riflescope with a pivot mount that is more durable, more accurate, and less susceptible to binding and walking than prior art pivot mounts.

SUMMARY OF THE INVENTION

A telescopic sight in accordance with the present invention includes an elongate housing having a bore extending through the housing along a central longitudinal axis of the housing. A pivot mount of the telescopic sight includes a fixed half-socket rigidly mounted to the housing within the bore and a movable half-socket slidably positioned within the bore opposing the fixed half-socket. A lens holder is disposed within the bore and includes a pivot end pivotally seated between the fixed and movable half-sockets for rotation about a pivot point. A resilient member biases the movable half-socket toward the fixed half-socket so as to capture the pivot end between the fixed half-socket and the movable half-socket while allowing pivoting movement of the lens holder therebetween. The lens holder extends within the bore generally along the longitudinal axis and terminates in a free end medially of an eyepiece end and an objective end of the housing, where it can support an erector lens assembly. The free end of the lens holder is engaged by a manual adjustment mechanism that is operated to drive the lens holder to rotate about the pivot point transversely of the longitudinal axis.

The fixed and movable half-sockets contact the pivot end at respective first and second pivot interfaces at which rotation of the lens holder about its pivot end generates respective first and second lateral frictional force components. The pivot contact surfaces are preferably sized and shaped so that the first and second lateral frictional force components substantially equalize each other and thereby prevent the lens holder from walking relative to the housing of the telescopic sight.

Additional aspects and advantages of this invention will be apparent from the following detailed description of preferred embodiments thereof, which proceeds with reference to the accompanying drawings.

DETAILED DESCRIPTION OF PREFERRED EMBODIMENTS

Figure 1:
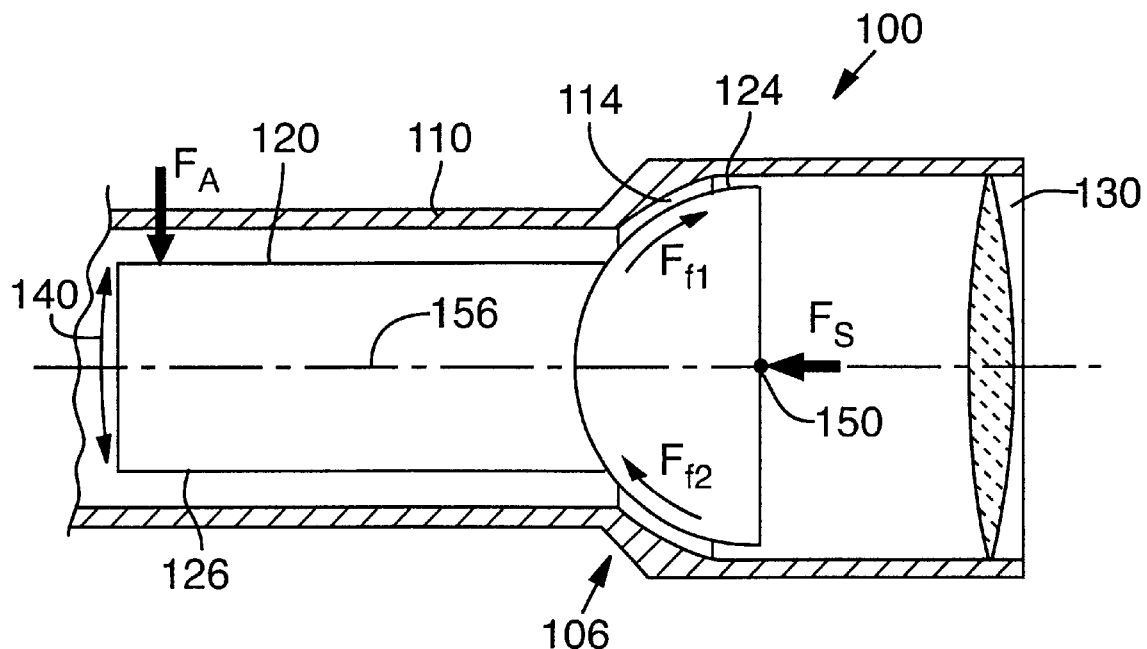
FIG. 1 is a schematic cross sectional view of a riflescope including a half-socket pivot mount in accordance with the prior art.
Figure 3:
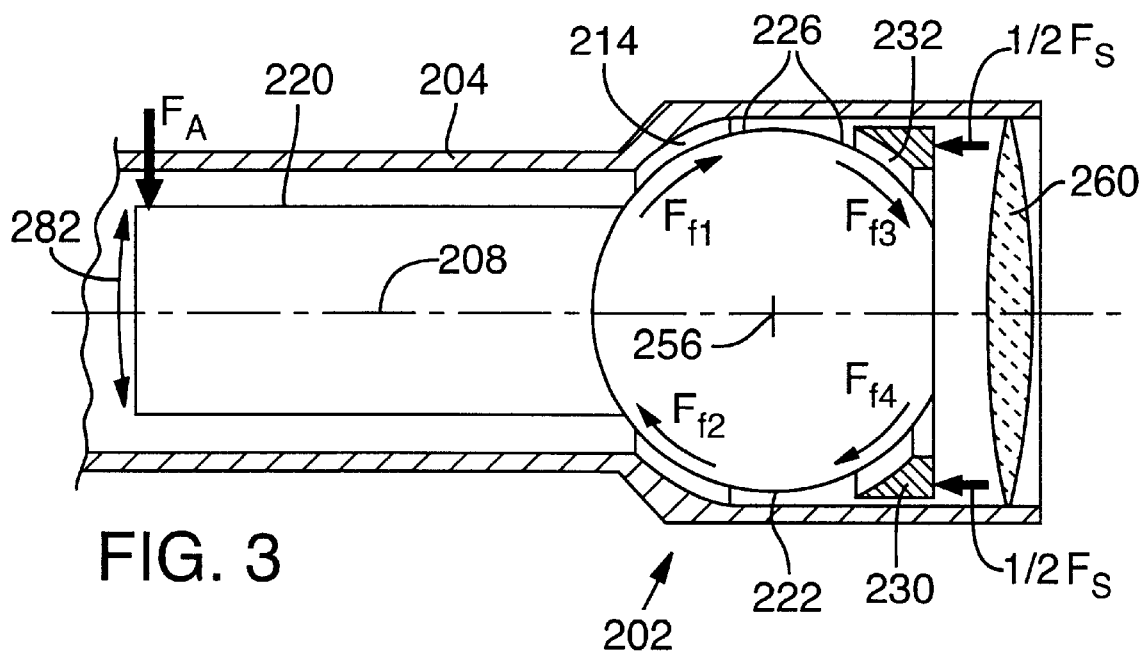
FIG. 3 is a schematic cross sectional view of the riflescope of FIGS. 2A and 2B.
Figure 2A:
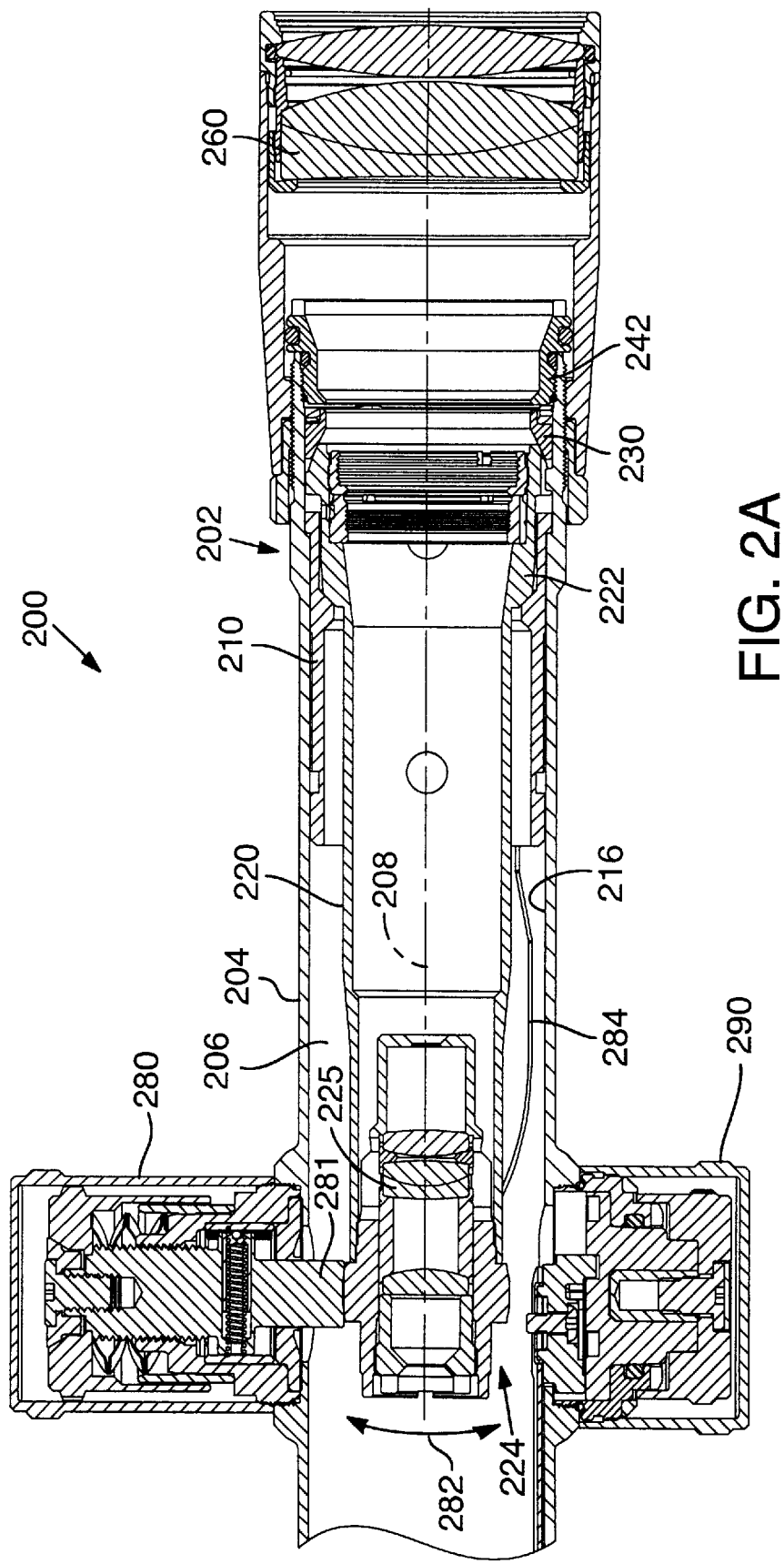
FIG. 2A is a partial cross sectional view of a riflescope and equalized pivot mount in accordance with the present invention.
Figure 2B:
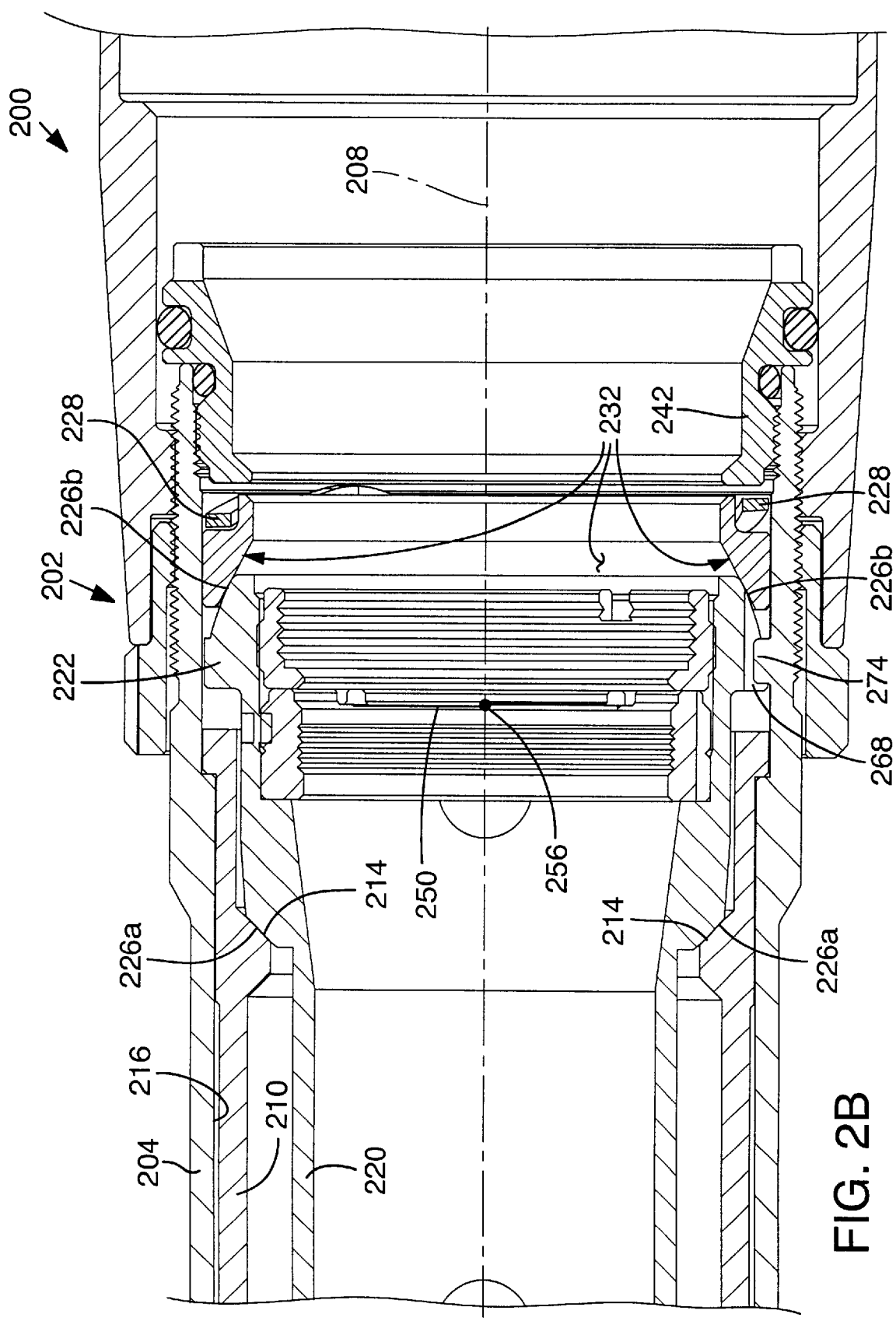
FIG. 2B is an enlarged view of the riflescope of FIG. 2A showing detail of the equalized pivot mount.

FIG. 2A, is a partial cross sectional view of a preferred embodiment riflescope 200, including a pivot mount 202 in accordance with the present invention. FIG. 2B is an enlarged cross sectional view of a portion of FIG. 2A showing in detail pivot mount 202. FIG. 3 is a schematic cross sectional view of riflescope 200. With reference to FIGS. 2A, 2B, and 3, riflescope 200 includes a tubular housing 204 having a bore 206 that extends along a longitudinal axis 208 of housing 204. A half-socket sleeve 210 having a fixed socket surface 214 is inserted within bore 206 and rigidly bonded or press-fit to an interior wall 216 of housing 204. Those skilled in the art will appreciate that fixed socket surface 214 could also be formed or machined directly in interior wall 216 of housing 204. A lens-holding pivot tube 220 mounted within bore 206 of housing 204 includes a pivot end 222 sized for a sliding fit against fixed socket surface 214 (as in FIG. 1, fixed socket surface 214 and pivot end 222 are spaced apart in FIG. 3 for clarity). Pivot tube 220 extends from pivot end 222 along longitudinal axis 208 and terminates in a free end 224 that supports an erector lens assembly 225 medially of housing 204.

Fixed socket surface 214 is preferably frusto-conical in shape, while pivot end 222 is preferably frusto-spherical in shape to help keep pivot end 222 centered on longitudinal axis 208. However skilled persons will appreciate that other shapes may be used for socket and pivot surfaces while keeping within the scope of the present invention. As shown in FIG. 3, pivot end 222 may comprise a single ball-shaped mating surface 226 having an outer diameter that is substantially larger than the minor diameter of fixed socket surface 214. However, in place of ball-shaped mating surface 226, pivot end 222 preferably includes a first frusto-spherical pivot surface 226a positioned against fixed socket surface 214 and a second frusto-spherical pivot surface 226b spaced apart and facing away from first pivot surface 226a, as shown in FIGS. 2A and 2B.

A movable socket ring 230 is slidably mounted within housing 204 for movement along longitudinal axis 208 and includes a frusto-conical movable socket surface 232 slidably abutting second pivot surface 226b. A resilient member, such as a wave spring 228 (FIG. 2B), biases movable socket ring 230 against pivot end 222 in the direction shown by Fs (FIG. 3). A lock ring 242 is externally threaded to mate with interior threads in housing 204. Lock ring 242 is screwed into place to compress wave spring 228 so that the desired amount of spring force Fs (FIG. 3) is applied against movable socket ring 230. A wire reticle 250 is mounted to pivot end 222 in a focal plane of rifle scope 200 generally perpendicular to longitudinal axis 208 so that cross-hairs (not shown) of reticle 250 are centered at a pivot point 256 (FIG. 3) of pivot end 222. An eyepiece 260 is threaded onto the end of housing 204 and environmentally sealed to protect pivot mount 202 from dust and debris.

In the embodiment shown, erector lens assembly 225 is rigidly mounted to pivot tube 220 so that the optical power of riflescope 200 is fixed. Skilled persons will appreciate that a power-varying erector of a type known in the art could also be employed with the present invention. Such a power-varying erector is described in detail in U.S. Pat. No. 6,005,711, for example, which is incorporated herein by reference. In a variable-power riflescope (not shown), erector lens assembly 225 would be slidably mounted within pivot tube 220. A cam sleeve (not shown) rotatably fitted around pivot tube 220 would drive erector lens assembly 225 for movement along pivot tube 220 generally along longitudinal axis 208, in response to manual rotation of a power-adjusting ring rotatably mounted around housing 204 and mechanically coupled to the cam sleeve.

A keyway slot 268 (FIG. 2B) extends longitudinally along pivot end 222 and mates with a key 274 formed in the interior of housing 204 to orient pivot tube 220 in a generally fixed rotational position about the longitudinal axis 208 of housing 204 (some play is necessary to accommodate the motion of windage and holdover adjustments). In an alternative embodiment, the keyway slot and the key are interchanged so that keyway slot 268 extends longitudinally along the interior of housing 204 and mates with key 274 formed in pivot end 222 to orient pivot tube 220 in a generally fixed rotational position about the longitudinal axis 208 of housing 204. Fixing the rotational position of pivot tube 220 about longitudinal axis 208 of housing 204 facilitates the use of an optical power adjustment cam in an alternative variable-power riflescope, in accordance with known methods.

A windage adjustment mechanism 280 is shown extending horizontally from housing 204 in FIG. 2A and includes a plunger 281 operatively engaged with free end 224 of pivot tube 220. Windage adjustment mechanism 280 adjustably extends into bore 206 and is manually adjustable to drive pivot tube 220 for movement transversely of longitudinal axis 208 in the direction indicated by arrows 282. Skilled persons will appreciate that an elevation adjustment mechanism (not shown) could also be applied to adjust the vertical position of pivot tube 220 in a direction perpendicular to windage adjustment mechanism 280. A leaf spring 284 connected to half-socket sleeve 210 biases free end 224 of pivot tube 220 toward windage adjustment mechanism 280 (and the elevation adjustment mechanism). A focus adjustment mechanism 290 is also shown.

In operation, adjustment of windage and/or holdover results in first lateral friction forces $F_{f1}$ and $F_{f2}$ (FIG. 3) generated at first pivot surface 226a and corresponding second friction forces $F_{f3}$ and $F_{f4}$ generated at second pivot surface 226b. The lateral components of first friction forces $F_{f1}$ and $F_{f2}$ are substantially equal and opposite of the lateral components of second friction forces $F_{f3}$ and $F_{f4}$ and thereby prevent the walking effect of prior art half-socket pivot mounts while keeping reticle 250 centered on longitudinal axis 208. Advantageously, pivot mount 202 requires less spring force $F_s$ to keep pivot end 222 centered on longitudinal axis 208 than is typically applied in prior art half-socket pivot mounts. Consequently, less adjusting force $F_A$ is required for making windage and holdover adjustments. Easier windage and holdover adjustment facilitates the precise adjustments desired by target shooting competitors. Reduced spring force also reduces wear at the interfaces between fixed and movable socket surfaces 214 and 232 and respective first and second pivot surfaces 226a and 226b, and helps maintain the accuracy of riflescope 200.

It will be obvious to those having skill in the art that many changes may be made to the details of the above-described embodiments of this invention without departing from the underlying principles thereof. The scope of the present invention should, therefore, be determined only by the following claims.

What is claimed is:

1. In a riflescope of the type including an elongate tubular housing having a longitudinal axis and a lens holder pivotally mounted within the tubular housing, the lens holder including a pivot end, and the riflescope including an adjustment device in operative engagement with the lens holder for rotating the lens holder about its pivot end transversely of the longitudinal axis, an improved pivot mount comprising:

a fixed half-socket rigidly supported by the housing within the interior of the housing;

a first pivot surface formed on the pivot end of the lens holder and sized for slidably seating against the fixed half-socket;

a second pivot surface formed on the pivot end of the lens holder, the second pivot surface spaced apart from the first pivot surface and facing away from the first pivot surface;

a movable half-socket movably positioned within the interior of the housing in opposing relation to the fixed half-socket and slidably abutting the second pivot surface; and a resilient member in operative engagement with the movable half-socket to bias the movable half-socket against the second pivot surface and toward the fixed half-socket, and to thereby capture the pivot end of the lens holder between the fixed half-socket and the movable half-socket to allow pivoting movement of the lens holder therebetween.

2. The improved pivot mount of claim 1 in which the fixed and movable half-sockets and the first and second pivot surfaces are sized and shaped so that rotation of the lens holder about its pivot end transversely of the longitudinal axis results in substantially equal and opposite lateral friction forces at the respective first and second pivot surfaces, thereby preventing the lens holder from walking within the pivot mount.

3. The improved pivot mount of claim 1 in which the resilient member includes a spring, and further comprising a lock ring threaded into the interior of the housing to retain and compress the spring.

4. The improved pivot mount of claim 1, further comprising:

a keyway formed in one of the lens holder and the housing; and a key formed in the other of the lens holder and the housing, the key engaged in the keyway to limit rotation of the lens holder about the longitudinal axis.

5. The improved pivot mount of claim 4 in which the riflescope has an optical power and further including:

an erector lens assembly slidably mounted to the lens holder for movement generally along the longitudinal axis; and a cam sleeve supported around at least a portion of the lens holder for rotation generally around the longitudinal axis, the cam sleeve driving the erector lens assembly for movement along the longitudinal axis to thereby adjust the optical power of the riflescope.

6. The improved pivot mount of claim 1 in which the fixed half-socket is frusto-conical in shape.

7. The improved pivot mount of claim 1 in which the movable half-socket is frusto-conical in shape.

8. The improved pivot mount of claim 1 in which the first and second pivot surfaces are integrated in a ball-shaped joint of the lens holder.

9. The improved pivot mount of claim 1 in which the first and second pivot surfaces comprise at least two oppositely facing frusto-spherical surfaces.

10. A telescopic sight, comprising:

an elongate housing, the housing including a bore extending through the housing, the bore having a longitudinal axis;

a fixed half-socket rigidly mounted to the housing within the bore;

a movable half-socket movably positioned within the bore of the housing and facing the fixed half-socket;

a lens holder having a pivot end and a free end, the pivot end pivotally seated between the fixed and movable half-sockets for rotation about a pivot point, the free end extending within the bore and generally along the longitudinal axis;

a resilient member in operative engagement with the movable half-socket to bias the movable half-socket toward the fixed half-socket so as to capture the pivot end between the fixed half-socket and the movable half-socket while allowing pivoting movement of the lens holder; and an adjustment device in operative engagement with the free end of the lens holder for rotating the lens holder about the pivot point transversely of the longitudinal axis.

11. The telescopic sight of claim 10 in which:

the fixed half-socket contacts the pivot end at a first pivot interface;

the movable half-socket contacts the pivot end at a second pivot interface; and rotation of the lens holder about its pivot end generates a first lateral frictional force component at the first pivot interface and a second lateral frictional force component at the second pivot interface, the first and second lateral frictional force components substantially equalizing each other to thereby prevent the lens holder from walking relative to the housing.

12. The telescopic sight of claim 10 in which the resilient member includes a spring, and further comprising a lock ring threaded into the bore of the housing to retain and compress the spring.

13. The telescopic sight of claim 10, further comprising:

a keyway formed in one of the lens holder and the bore of the housing; and a key formed in the other of the lens holder and the bore, the key engaged in the keyway to limit rotation of the lens holder about the longitudinal axis.

14. The telescopic sight of claim 10 in which the telescopic sight has an optical power and further comprising:
- an erector lens assembly slidably mounted to the lens holder for movement generally along the longitudinal axis; and
- a cam sleeve supported around at least a portion of the lens holder for rotation generally around the longitudinal axis, the cam sleeve driving the erector lens assembly for movement along the longitudinal axis to thereby adjust the optical power of the telescopic sight.

15. The telescopic sight of claim 10 in which the fixed half-socket is frusto-conical in shape.

16. The telescopic sight of claim 10 in which the movable half-socket is frusto-conical in shape.

17. The telescopic sight of claim 10 in which the pivot end includes a substantially spherical outer surface.

18. The telescopic sight of claim 10 in which the pivot end includes:
- a first frusto-spherical pivot surface facing the fixed half-socket; and
- a second frusto-spherical pivot surface facing the movable half-socket.

19. The telescopic sight of claim 18 in which the fixed half-socket and the movable half-socket are frusto-conical in shape.

* * * * *